Dec. 11, 1956 L. R. ULLERY 2,773,992

DISPLAY AMPLIFIER AND METHOD OF MAKING SAME

Filed June 17, 1953

INVENTOR.
LEE R. ULLERY
BY
Lockwood, Galt, Woodard, & Smith
ATTORNEYS

United States Patent Office 2,773,992

Patented Dec. 11, 1956

2,773,992

DISPLAY AMPLIFIER AND METHOD OF MAKING SAME

Lee R. Ullery, Fort Wayne, Ind., assignor to International Telephone and Telegraph Corporation, a corporation of Maryland Application June 17, 1953, Serial No. 362,204

22 Claims. (Cl. 250—213)

The present invention relates to a display amplifier and method of making same, and more particularly to an amplifier for reproducing, faithfully, a given radiation image.

In the Journal of the Optical Society of America, vol. 44, No. 4, April 1954, pages 297–299, an article entitled "A solid-state image intensifier" by Richard K. Orthuber and Lee R. Ullery describes a display-amplifying device of the type contemplated by this invention. This display-amplifying device is embodied in a laminated cell construction in which the laminae, for all practical purposes, are arranged in the manner of an ordinary parallel-plate condenser having a dielectric material interposed between the two plates. The plates of the condenser are composed of electrically conducting material, such as metal, in such thin films as to be transparent. The dielectric is comprised of two parts; viz., a lamina of photo-conductive material, such as cadmium sulphide, having high dark electrical impedance and a contiguous lamina of electro-luminescent material which may be excited to luminescence by the application thereto of a variable electric field. A typical suitable material for this electro-luminescent lamina is a copper activated zinc oxide and zinc sulphide mixture as explained by Destriau in the 1937 edition, volume 38 of Philosophical Magazine, on pages 700 to 739, 774 to 793, and 800 to 887. Other suitable materials are also described in these pages.

With the application of an exciting alternating voltage to the two plates of this display amplifier, a voltage drop may be considered to exist therebetween which is the sum of the two voltage drops occurring across the respective two dielectric layers. By designing these dielectric layers in a predetermined manner, the electro-luminescent material may be prevented from luminescing in the absence of exciting light, but, on the other hand, caused to luminesce when light energy is projected onto the photo-conductive layer. During this latter condition, the electrical characteristics of the photo-conductive layer are so changed as to alter the distribution of voltages across the two layers in a direction to increase the magnitude of the voltage applied to the electro-luminescent layer. With this increase of voltage, the electro-luminescent layer will emit light of such brightness as corresponds to the change in electrical characteristics of the photo-conductive layer.

Such an amplifier has particular utility in the reproduction of television and motion picture displays. This amplifier provides amplification of the image projected upon it, whereby an image of low brightness produced by a relatively small television picture tube may be magnified many times and reproduced in highly brightened condition for clear observation.

The reproduction characteristics of this amplifier are dependent in part upon the design of the photo-conductive lamina. Thus, by varying certain structural features of this lamina, corresponding variation of reproduction characteristics may be achieved.

In view of the foregoing, it is an object of this invention to provide a photo-conductive lamination for an amplifying screen, which is of such character as will conduce to the reproduction of an image in relatively high definition form.

It is another object of this invention to provide a method of fabricating such a photo-conductive lamination.

It is a further object of this invention to provide a photo-conductive, sheet-like lamination which possesses relatively low electrical capacity and relatively high electrical dark-resistance. As a corollary, it is another object to provide such a layer which possesses uniform-electrical characteristics throughout its extent whereby faithful reproduction of a radiation-image may be obtained.

It is another object to provide a photo-conductive element for such an amplifying screen which will conduce to the reliable and consistent reproduction of all elemental parts of a radiation-image projected upon the amplifier without blur or diffusion.

It is another object to provide a method for producing the arrangements of the foregoing objects.

In accordance with the present invention, there is provided a photo-sensitive sheet-like element composed of a perforate or undulated insulating material of predetermined thickness, and a film of photo-conductive material on the bordering surfaces of the perforations or undulations respectively. Such photo-sensitive element will possess an impedance between the opposite sides, which is dependent upon the thickness of the element or, in other words, the length of the semi-conductive path between the opposite sides of the element provided by the photo-conductive material.

For a better understanding of the invention, together with other and further objects thereof, reference is made to the following description, taken in connection with the accompanying drawings, the scope of the invention being defined by the appeded claims.

Figure 1:
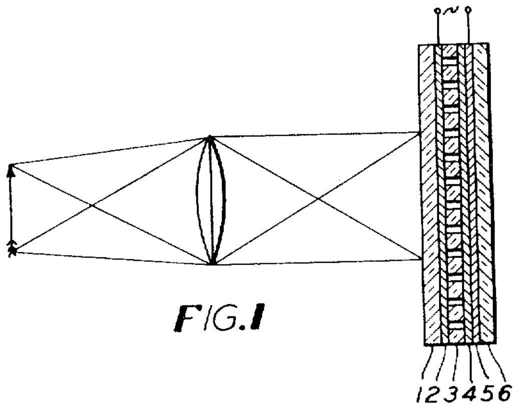
Figure 1 is a cross-sectional view of a light-amplifying device of this invention.
Figure 2:
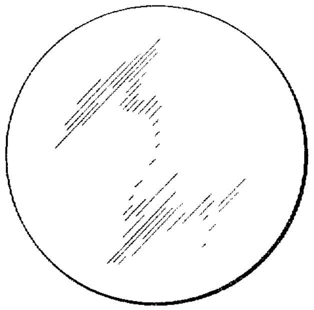
Figure 2 is a front elevation thereof.

Referring to Fig. 1 of the drawings, the display amplifier is composed of a laminated assembly of planar construction and is of suitable configuration such as the circular form shown in Figure 2. The laminations of this assembly comprise a glass or the like supporting disc 1, a transparent film of conductive material 2, such as evaporated silver applied to one side of the disc 1, a layer 3 of photo-conductive material (cadmium sulphide for example) applied to the film 2, a lamina of electro-luminescent material 4 mounted on the layer 3, another film 5 of conductive material which may be identical to the material of film 2, and a supporting glass disc 6 mounted adjacent the film 5. A light attenuating insulating lamina (not shown in Fig. 1) may be interposed between layers 3 and 4 for limiting light-feedback therebetween.

Figure 3:
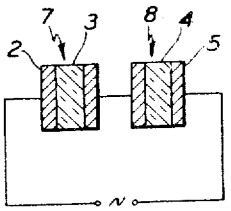
Figure 3 is an equivalent circuit diagram used in explaining the principles of operation thereof.

The equivalent electrical circuit of this assembly is represented by Figure 3. The condenser, generally indicated by the reference numeral 7, is composed of the film electrode 2 and the photo-conductive material 3, and the other condenser, generally indicated by the reference numeral 8, is composed of electro-luminescent lamina 4 and the film electrode 5. By application of an alternating exciting voltage of, for example, 600 volts, at 800 cycles, across the two electrodes 2 and 5, a certain distribution of voltages or voltage division will occur across the two condensers 7 and 8, since they are connected in series. At first if it is assumed that the condensers 7 and 8 are subjected to a condition of "no light" (in other words placed in a completely darkened room) a certain voltage division will be obtained. Now, if it is assumed that the photo-conductive material of the condenser 7 is illuminated, the impedance characteristics of the material will correspondingly change thereby altering this division of voltages. Since such illumination tends to lower the impedance of the photo-conductive material 3, an increase of voltage will be applied to the lamina 4. This lamina 4 thereupon luminesces with a brightness dependent upon the magnitude of the alternating voltage applied thereto, so it becomes apparent that as the impedance of the condenser 7 decreases, the material 4 of the condenser 8 will be made to luminesce.

It is important that the photo-conductive layer 3 possesses a relatively low capacity when no light is projected thereon. Similarly, the dark-resistance of this layer 3 should be high. With the impedance properly designed, the division of voltage across the two condensers 7 and 8 would be such as to impose substantially all of the voltage across condenser 7 and a very small voltage across the condenser 8 during "no light" conditions. By assuring that this latter voltage is sufficiently small, the electroluminescent lamina 4 will not luminesce. Now, assuming the condition of projecting incident light on the layer 3 of progressively increasing brightness, the impedance across the layer 3 will correspondingly decrease thereby altering the division of voltages across the two condensers 7 and 8 in a direction to increase the voltage across electroluminescent material 4. When the threshold of luminescing sensitivity of this lamina 4 has been reached, luminescence will be produced to a degree dependent upon the magnitude of the voltage impressed thereacross.

Known methods of preparing a photo-conductive surface comprised of, for example, evaporated cadmium sulphide, have been found not to be satisfactory for producing the layer 3 to a sufficient thickness for providing the necessary controlling impedances. The principal reason for this difficulty resides in the fact that such known methods provide photo-conductive surfaces which tend to fall apart or separate from their substrates when made to sufficient thicknesses. In order to obtain proper control it is, however, necessary to provide sufficient thickness in order to reduce the admittance of the photo-conductive layer, which if too high would lead to a light emission of the layer 4 even if layer 3 is not illuminated.

Figure 5:
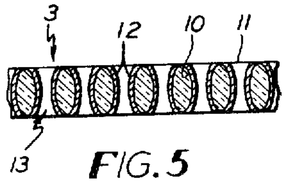
Figure 5 is a fragmentary cross-sectional view of the lamination of Figure 4.
Figure 4:
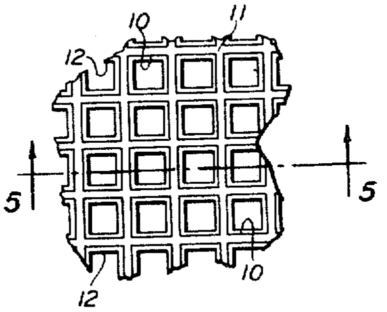
Figure 4 is a fragmentary elevational view of one form of photo-conductive lamination used in the screen of Figure 1.

In Figures 4 and 5, are shown one suitable construction for a photo-conductive layer 3. This layer is composed of a sheetlike element or matrix (preferably opaque), referred to in the claims as a "supporting element" having perforations of substantially equal size which may be spaced orderly and regularly. These perforations are indicated by the reference numeral 10, and the matrix is indicated by the reference numeral 11. This matrix 11 may be compared to an ordinary wire screen having the usual mesh openings.

This matrix 11 may be composed of any suitable insulating material, but is preferably made of photoform glass, and its thickness is made suitably large as will become apparent from the following description.

Upon this matrix is deposited a thin film of photo-conductive material indicated by the reference numeral 12, this material being of any suitable, known composition. The thickness of the film is made such as to produce the desired operating characteristics as will be explained more fully in the following. In the present instance, cadmium sulphide is preferred as the photo-conductive material, and the thickness of the film may range from between 2 to 20 microns. This film may be evaporated onto the matrix according to any suitable method, one such method being given by R. E. Aitchison in Nature Magazine, volume 167, page 812.

After the step in the process of evaporating the film 12 onto the matrix 11 has been completed, it is preferable to either grind or scrape the opposite surfaces of the matrix 11 to clean the photo-conductive material therefrom. Thus, considering one perforation only of the finished element, this perforation being indicated by the reference numeral 13, in Figure 5, such perforation may be considered as being defined by a tubular member of photo-conductive material, the opposite ends of this tubular member being fully exposed for the connection thereto of external electrical circuitry. The impedance between the ends of this member will correspond to the physical length of the latter whereupon it is possible to design the necessary dielectric characteristic for the condenser 7 as explained hereinbefore.

In considering the operation of the assembly of Figure 5 in the amplifier in Figure 1, a pinpoint ray of light may be considered as entering one of the perforations, for example, the perforation 13. This ray projected upon the left-hand side of the amplifier in Figure 1 will penetrate to the corresponding elemental area of the lamina 4, and will be partially reflected therefrom to impinge upon the film 12 which lines the perforation. The impedance of this film will thereupon lower causing a reduction in voltage drop between the opposite ends of the film. A corresponding increase in voltage will be applied to the cross-sectional area of the contiguous portion of the lamina 4 causing the latter to luminesce. Since the film 12 surrounding the perforation 13 is operatively isolated from all of the other perforation-films, the sections of the photo-conductive layer 3 adjacent the excited film will not be affected. This tends to restrict laterally the effect of incident light on the layer 3 to only that point which is illuminated, thereby reducing and eliminating the tendency of diffused or scattered excitation of the photo-conductive material. Stated in other words, lateral conduction in the layer 3 is substantially suppressed. The practical result is that a pinpoint of light incident on the left-hand side of the amplifier of Figure 1 will appear as a pinpoint of light on right-hand side of the screen in direct registry therewith. It will now be apparent that an image of complex design may be projected upon the left-hand face of the amplifier and be reproduced in faithful form on the observation side.

Figure 6:
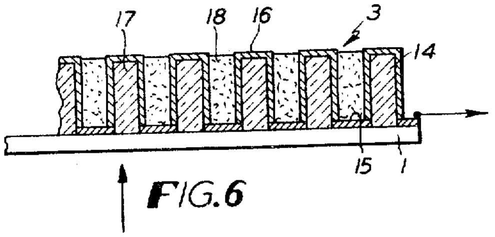
Figure 6 is a cross-sectional view of another photo-conductive lamination.
Figure 7:
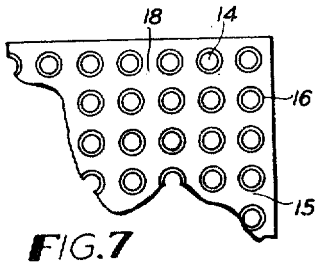
Figure 7 is a fragmentary elevational view of the lamination of Figure 6.

An alternative form of the layer 3 is illustrated by Figures 6 and 7. This layer is composed of the disc 1 on which are mounted a plurality of upstanding spines or supports 14 orderly and regularly spaced apart, thereby providing a "supporting element" corresponding to element 11 of Figs. 4 and 5. As seen in Figure 6, this provides a profile contour having evenly spaced crests and depressions. In the depression portions, is provided a conductive material such as evaporated silver or the like 15. Instead of silver, these depressions may be "irridized" to provide a transparent conductive surface such as that disclosed by the Kennedy Patent No. 2,559,969 issued July 10, 1951. The crest portions are covered by evaporated photo-conductive material which extends into electrical contact with the coating 15. This photo-conductive material is indicated by the film 16. Suitable opaque material 18 may be filled in the spaces between coated supports 14.

Considering the operation of this assembly when incorporated in the amplifier of Figure 1, the coating 15 may be substituted for the electrode film 2. The lamina 4 will thereupon be superposed onto the upper ends of the supports 14.

Considering again a ray of light entering, for example, the support 17, the photo-conductive film on this support will be excited thereby reducing the impedance thereof between the layer 15 and the lamina 4. Electro-luminescent material contiguous with this excited film will thereupon be excited to an extent corresponding to this impedance drop.

For the same reasons as stated in explaining the operation of the assembly of Figures 5 and 6, substantially exact reproduction of an image is enabled by the use of relatively long photo-conductive paths which determine the layer 3 dielectrically.

By following the teachings of this invention, as explained in the foregoing, it is possible to utilize known methods and techniques for fabricating photo-conductive films and surfaces for forming photo-conductive electrodes for the amplifier of Figure 1. The difficulty encountered in evaporating a sufficiently thick film of suitable physical characteristics is obviated by the use of either of the different matrices described. While perforate and undulated "supporting elements" 11 and 1, 14 have been described for use in achieving the desired electrical characteristics in the photo-conductive material, it will be understood that different shapes and configurations of such supports are possible without deviating from the scope of this invention. The important aspect of this invention resides in the fact that a means is provided for achieving a desired impedance characteristic in the photo-conductive lamina of the amplifier for obtaining the necessary control in exciting the electro-luminescent material.

While there has been described what is at present considered the preferred embodiments of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. The method of fabricating a radiation amplifier electrode of sheet-like construction which is of predetermined thickness comprising the steps of producing a sheet-like element of insulating material, said element being provided with a plurality of parallel aligned spaced insulating supports, applying conductive material to said element in the spaces between said supports, and applying a film of photo-conductive material onto said supports in contact with said conductive material.

2. The method of fabricating a radiation amplifier electrode of sheet-like construction which is of predetermined thickness comprising the steps of producing a sheet-like element of insulating material, said element being provided with a plurality of parallel aligned spaced insulating supports, applying conductive material to said element in the spaces between said supports, and evaporating a film of photo-conductive material onto said supports in contact with said conductive material.

3. A radiation amplifier electrode comprising a sheet-like perforate element of insulating material of predetermined thickness, and a film of photo-conductive material on the peripheral surfaces of the perforations of said element, said film extending from side to side of said element.

4. A radiation amplifier electrode having a predetermined electrical impedance comprising a perforate sheet-like element of glass material, said element having a predetermined uniform thickness throughout its extent, and a film of photo-conductive material lining the surfaces of all of the perforations of said element throughout the axial extent thereof thereby providing predetermined impedance characteristics of said photo-conductive lining between opposite sides of said element, said film being substantially of uniform thickness for all of said perforations.

5. A radiation amplifier electrode having a predetermined electrical impedance comprising a flat insulator base member having a plurality of upstanding insulating supports thereon, a conducting material on said base in the spaces between said supports, and a covering of photo-conductive material on said supports extending into electrical contact with said conducting material.

6. A radiation amplifier electrode having a predetermined electrical impedance comprising a flat insulator base member having a plurality of upstanding insulating supports spaced equal distances apart, an electrical conductor provided in the spaces between said supports, and a covering of photo-conductive material on said supports which extends into electrical contact with said conductor, said covering being substantially of uniform thickness on all supports.

7. A dielectric assembly for use in a radiation amplifier comprising two elements of dielectric material in series arrangement, one element including electro-luminescent material, the other element including a plurality of operatively isolated masses of photo-conductive material carried by a supporting member, said supporting member providing a plurality of surfaces upon which said photo-conductive material is supported and which extend a predetermined distance away from said one element, said masses constituting electrically independent impedances in series arrangement with said one element.

8. A dielectric assembly for use in a radiation amplifier comprising two elements of dielectric material coupled in series arrangement, one element including electro-luminescent material, the other element including a flat insulator base member having a plurality of upstanding insulating supports thereon, a conducting material on said base in the spaces between said supports, and a covering of photo-conductive material on said supports extending into electrical contact with said conducting material, the photo-conductive covering on the individual supports constituting electrically independent impedances connected in series with said one element.

9. A dielectric assembly for use in a radiation amplifier comprising two elements of dielectric material in series arrangement, one element including electro-luminescent material, the other element including a plurality of operatively isolated masses of photo-conductive material carried by a supporting member, said supporting member providing a plurality of surfaces upon which said photo-conductive material is supported, said masses constituting electrically independent impedances in series arrangement with said one element.

10. A dielectric assembly for use in a radiation amplifier comprising two elements of dielectric material in series arrangement, one element including electro-luminescent material, the other element including a plurality of operatively isolated masses of photo-conductive material, said masses constituting electrically independent impedances in series arrangement with said one element.

11. A radiation amplifier electrode having a predetermined electrical impedance comprising a sheet-like insulator base member having a plurality of insulating supports, an electrical conductor provided in the spaces between said supports, and photo-conductive material on said supports which extends into electrical contact with said conductor, said covering being substantially of uniform thickness on all supports.

12. A radiation amplifier electrode comprising a supporting member composed of insulating material, said member having a mounting surface and a plurality of separated supporting surfaces which extend in a direction generally transverse to said mounting surface, and photo-conductive material on said transverse supporting surfaces, the material on separate supporting surfaces being operatively isolated from each other.

13. The method of fabricating a radiation amplifier electrode of sheet-like construction which is of predetermined thickness comprising the steps of producing a sheet-like element of insulating material, said element being provided with a plurality of spaced depressions, applying conductive material in said depressions, and applying photosensitive material into said depressions in contact with said conductive material, said photosensitive material having impedance characteristics which vary with varying intensity of incident radiation.

14. The method of fabricating a radiation amplifier electrode of sheet-like construction which is of predetermined thickness comprising the steps of producing a sheet-like element of insulating material, said element being provided with a plurality of spaced depressions, applying conductive material into said depressions, and applying a photosensitive material against the side surfaces of said depressions in contact with said conductive material, said photosensitive material having impedance characteristics which vary with varying intensity of incident radiation.

15. The method of fabricating a radiation amplifier electrode of sheet-like construction which is of predetermined thickness comprising the steps of producing a sheet-like element of insulating material, said element being provided with a plurality of spaced depressions, applying conductive material into said depressions, and applying a film of photoconductive material to the side surfaces of said depressions in contact with said conductive material.

16. A radiation-handling device comprising two elements of dielectric material electrically in series, one element including electroluminescent material, the other element including a plurality of operatively isolated masses of photosensitive material, said photosensitive material having impedance characteristics which vary in response to varying intensity of incident radiation, said masses constituting electrically independent impedances in series arrangement with said one element, and means for applying an electric field in series with said two elements.

17. A radiation-handling device comprising a layer of electroluminescent phosphor material, a plurality of photoconductive elements electrically in series with said phosphor layer, said elements having surfaces extending transversely away from said phosphor layer which may be impinged by incident radiation, and means for applying an electric field to said phosphor layer and said elements.

18. A radiation-handling device comprising a layer of electroluminescent phosphor material, a voltage-controlling layer electrically in series with said phosphor layer, said voltage-controlling layer including photoconductive material having surfaces extending transversely with respect to said phosphor layer, said surfaces being exposed to incident radiation, and means for applying an electric field to said phosphor layer and said elements.

19. A radiation-handling device comprising a layer of electroluminescent phosphor material, a voltage-controlling layer electrically in series with said phosphor layer, said voltage-controlling layer including photoconductive material, said voltage-controlling layer in the absence of light having a predetermined low value of admittance to prevent the phosphor layer from luminescing, said voltage-controlling layer having light-transmissive characteristics permitting incident light to penetrate to a depth which produces a change in said admittance to a degree sufficient to control luminescing of said phosphor layer, and means for applying an electric field to said layers.

20. A radiation-handling device comprising a layer of electroluminescent phosphor material, a voltage-controlling layer electrically in series with said phosphor layer and having a predetermined thickness dimension, said voltage-controlling layer including photoconductive material which extends in the direction of said thickness dimension, said voltage-controlling layer being substantially transparent to incident light to a depth substantially equal to the distance which said photoconductive material extends in the direction of said thickness dimension, and means for applying an electric field to said layers.

21. A radiation-handling device comprising a layer of electroluminescent phosphor material, a voltage-controlling layer electrically in series with said phosphor layer, said voltage-controlling layer including photoconductive material, said photoconductive material comprising a plurality of discrete elements, each element conducting current in a predetermined direction, each element receiving radiation in a direction transverse to said predetermined direction of current flow, and means for applying an electric field to said layers.

22. A radiation-handling device comprising two plate-like electrodes, two layers of dielectric material electrically in series between said electrodes, one of said layers including electroluminescent phosphor material and the other layer including photoconductive material, means for preventing lateral conduction in the photoconductive layer, means for preventing luminescence of a given area of the phosphor layer from impinging adjacent laterally spaced areas of said photoconductive layer, and means for applying an electric field to said layers.

References Cited in the file of this patent

UNITED STATES PATENTS

| | | |
|---|---|---|
| 1,903,112 | Henroteau | Mar. 28, 1933 |
| 2,013,162 | McCreary | Sept. 3, 1935 |
| 2,163,266 | Bartels | June 20, 1939 |
| 2,168,259 | Gorlich | Aug. 1, 1939 |
| 2,322,361 | Iams | June 22, 1943 |
| 2,401,786 | Law | June 11, 1946 |
| 2,416,720 | Teal | Mar. 4, 1947 |
| 2,617,058 | De Boer et al. | Nov. 4, 1952 |
| 2,645,721 | Williams | July 14, 1953 |
| 2,650,310 | White | Aug. 25, 1953 |

FOREIGN PATENTS

| | | |
|---|---|---|
| 157,101 | Australia | June 16, 1954 |

Notice of Adverse Decision in Interference

In Interference No. 90,474 involving Patent No. 2,773,992, L. R. Ullery, Display amplifier and method of making same, final judgment adverse to the patentee was rendered June 18, 1964, as to claims 10, 16, 17, 18, 19 and 20.

[*Official Gazette August 25, 1964.*]